April 1, 1924.  1,488,619
J. SCHURCH
COMMUTATOR FOR DYNAMO ELECTRIC MACHINES
Filed April 24, 1922
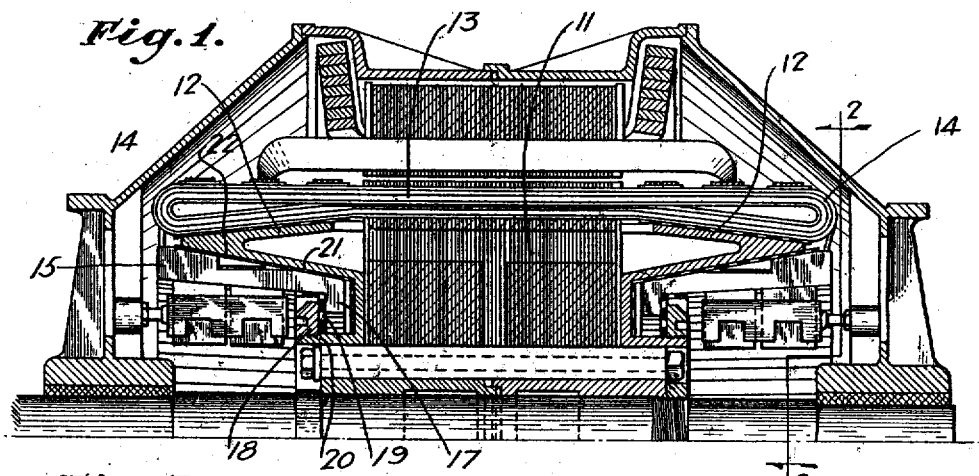
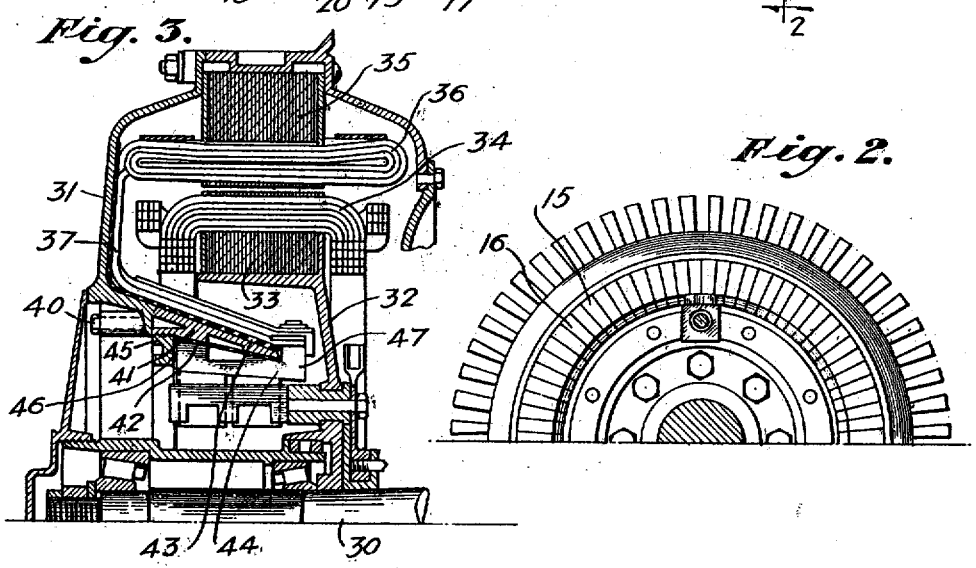
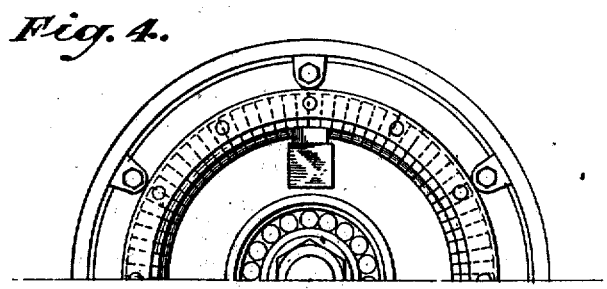
INVENTOR:
JACOB SCHURCH,
BY
ATTORNEYS.

Patented Apr. 1, 1924.

1,488,619

UNITED STATES PATENT OFFICE.

JACOB SCHURCH, OF LOS ANGELES, CALIFORNIA, ASSIGNOR OF ONE-HALF TO WILLIAM H. HEISE, OF LOS ANGELES, CALIFORNIA.

COMMUTATOR FOR DYNAMO-ELECTRIC MACHINES.

Application filed April 24, 1922. Serial No. 556,171.

*To all whom it may concern:*

Be it known that I, JACOB SCHURCH, a citizen of the United States, residing at Los Angeles, in the county of Los Angeles and State of California, have invented a new and useful Improvement in Commutators for Dynamo-Electric Machines, of which the following is a specification.

My invention relates to dynamo electrical machinery, and is particularly applicable to direct current machines, in which it is highly desirable to reduce the axial length. It is, therefore, particularly applicable to railway motors, or motors applied to other vehicles. I have applied it with considerable success to motors carried in the wheels of automobiles.

The principal object of my invention is to provide an internal type of commutator which may be combined with well known standard forms of winding to reduce the axial length of direct current motors and generators.

A further object of my invention is to provide a commutator which will be very strong mechanically, and which can be readily produced and maintained by comparatively unskilled labor.

Further objects and advantages will be made evident hereinafter.

Referring to the drawing which is for illustrative purposes only:

Fig. 1 is a cross section through a generator having my invention embodied therein.

Fig. 2 is an elevation of the commutator, shown in Fig. 1.

Fig. 3 is a cross section through a motor, having an alternative form of commutator as applied to a vehicle.

Fig. 4 is an end elevation of the form, shown in Fig. 3.

In the form of my invention shown in Fig. 1, 11 is an armature core, having an end bell 12 at each end thereof. The armature winding 13 is carried in slots in the core 11, the end connections 14 resting upon and being supported by the end bells 12.

The end bells 12 are internally tapered as shown at 21 to form a frusto conical bore in which insulation 22 is placed. This insulation consists of mica or other suitable insulation matter of considerable mechanical strength. A commutator assembly 15 consisting of individual segments 16 separated by mica is placed inside each of the bores 21. These segments are provided with lugs 17 which are acted upon by a nut 18 insulated therefrom by mica 19. The nut 18 is threaded upon an extension 20 of the end bell 12. By setting up the nut 18, the lugs 17 are forced in the direction of the small diameter of the bore 21, thus compressing and compacting the segments into a single rigid mass.

In the form of my invention illustrated in Figs. 3 and 4, 30 is an axle upon which a wheel structure 31 is free to rotate in ball bearings, as shown. A stationary structure 32 is provided which carries field punchings 33 in which a field winding 34 is placed. Carried in the rotating structure 31 are armature punchings 35 which carry armature windings 36, these windings being provided with leads 37. Secured in the rotating structure 31 by means of bolts 40 is a commutator shell 41 which has a tapered bore 42 in which insulation 43 is carried. An assembly of commutator segments 44 is mounted inside this bore, being forced toward the small diameter thereof by means of a nut 45 which is insulated from the segments by insulation 46. Each of the commutator segments has a lug 47 into which one or more of the leads 37 is secured in the usual manner.

It will be noted that by using an internal type of commutator, I am able to move the commutator in very close to the punchings utilizing the space outside of the commutator for the end connection of the armature winding. In the form shown in Fig. 3 I am able to get a long commutator which lies in the same plane as the armature punchings. While I have shown a commutator having its internal bore slightly tapered, and while I prefer this slightly tapered commutator, I wish it to be understood that I do not limit myself to this form of construction.

I claim as my invention:

1. In a commutator for a dynamo electric machine, the combination of: an assembly of commutator segments having an internal bore forming a brush surface and a frusto-conical periphery; a shell having a frusto-conical bore in which said frusto-conical periphery of said segments fits; means for insulating said assembly from said shell; a series of lugs, each formed on one of said segments; a nut engaging all of said lugs for forcing said assembly towards the small diameter of the bore of said shell; and means for insulating said nut from said segments.

2. In a commutator for a dynamo electric machine, the combination of: an assembly of commutator segments having an internal frusto-conical bore forming a brush surface and a frusto-conical periphery; a shell having a frusto-conical bore in which said frusto-conical periphery of said commutator segments fits; means for insulating said assembly from said shell; a nut pressing against said segments for forcing the same toward the small diameter of said shell; and means for insulating said nut from said segments.

3. In a commutator for a dynamo electric machine, the combination of: an assembly of commutator segments having an internal frusto-conical bore and a frusto-conical periphery; a shell having a frusto-conical bore in which said frusto-conical periphery of said commutator segments fits; means for insulating said assembly from said shell; a series of lugs, each formed upon one of said segments; a nut engaging all of said lugs for forcing said assembly toward the small diameter of said shell; and means for insulating said nut from said segments.

In testimony whereof, I have hereunto set my hand at Los Angeles, California, this 18th day of April, 1922.

JACOB SCHURCH.